(12) United States Patent
Bengtson

(10) Patent No.: US 6,178,707 B1
(45) Date of Patent: Jan. 30, 2001

(54) SMALL SKYLIGHT WITH NON-TRACKING SOLAR COLLECTOR

(76) Inventor: Daniel Emilio Bengtson, Estanislao Diaz 455-San Isidro-Pcia de, Buenos Aires (AR)

(*) Notice: Under 35 U.S.C. 154(b), the term of this patent shall be extended for 0 days.

(21) Appl. No.: 09/193,137

(22) Filed: Nov. 17, 1998

(30) Foreign Application Priority Data

Aug. 13, 1998 (AR) .......................................... P98-0104012

(51) Int. Cl.⁷ .................................................. E04D 13/03
(52) U.S. Cl. ............................................ 52/200; 359/597
(58) Field of Search ................................. 52/173.3, 200; 359/591, 592, 595, 597, 598

(56) References Cited

U.S. PATENT DOCUMENTS

| | | | |
|---|---|---|---|
| 668,404 | * 2/1901 | Hanneborg | 359/597 |
| 1,254,520 | * 1/1918 | Macouff | 359/595 |
| 3,899,672 | 8/1975 | Levi-Setti . | |
| 3,902,794 | 9/1975 | Abrams . | |
| 3,923,381 | 12/1975 | Winston . | |
| 3,964,464 | 6/1976 | Hockman . | |
| 4,003,638 | 1/1977 | Winston . | |
| 4,131,485 | 12/1978 | Meinel et al. . | |
| 4,201,197 | 5/1980 | Dismer . | |
| 4,222,370 | 9/1980 | DeGeus . | |
| 4,246,477 | * 1/1981 | Latter | 359/595 |
| 4,306,769 | 12/1981 | Martinet . | |
| 4,329,021 | 5/1982 | Bennett et al. . | |
| 4,349,245 | 9/1982 | Kliman . | |
| 4,411,490 | 10/1983 | Daniel . | |
| 4,475,536 | 10/1984 | Dame . | |
| 4,541,414 | 9/1985 | Mori . | |
| 4,561,424 | 12/1985 | Gill et al. . | |
| 4,575,196 | 3/1986 | Clegg . | |
| 4,612,913 | 9/1986 | Mori . | |
| 4,720,170 | * 1/1988 | Learn, Jr. | 359/597 |
| 4,883,340 | 11/1989 | Dominguez . | |
| 5,062,899 | 11/1991 | Kruer . | |
| 5,099,622 | 3/1992 | Sutton . | |
| 5,374,317 | 12/1994 | Lamb et al. . | |
| 5,467,564 | 11/1995 | DeKeyser et al. . | |
| 5,493,824 | 2/1996 | Webster et al. . | |
| 5,540,216 | 7/1996 | Rasmusson . | |
| 5,578,140 | 11/1996 | Yogev et al. . | |
| 5,648,873 | 7/1997 | Jaster et al. . | |
| 5,655,339 | 8/1997 | DeBlock et al. . | |
| 5,878,539 | * 3/1999 | Grubb | 52/200 |
| 5,896,712 | * 4/1999 | Chao | 52/200 |
| 5,983,581 | * 11/1999 | De Block et al. | 52/200 |

* cited by examiner

*Primary Examiner*—Michael Safavi
(74) *Attorney, Agent, or Firm*—Robert E. Bushnell, Esq.

(57) ABSTRACT

A new small skylight which can be installed in buildings in general, on the roof of rooms requiring natural lighting. The advantage of this skylight over previous ones lies in its small size, thus avoiding having to make a wide roof opening for installation, with the consequent risks and dangers involved. An external reflecting flat sheet rotating with respect to a transverse axis placed on the top base of a vertical light conduit tube. The tube intercalated by a jacket tube, goes through the roof. The external reflecting sheet sends the collected light beams to a mirror, which is tilted on the vertical tube, the interior surface of the tube being capable of receiving and sending towards the interior of the room he reflected light beams received from said mirror. Another embodiment allows the user to regulate the external reflector operative tilting, as well as to rotate respect to a vertical axis to achieve for the best orientation relative to the sun.

17 Claims, 6 Drawing Sheets

SMALL SKYLIGHT WITH NON-TRACKING SOLAR COLLECTOR

CLAIM OF PRIORITY

This application makes reference to, incorporates the same herein, and claims all benefits accruing under 35 U.S.C. §119 from an application for SMALL SKYLIGHT WITH NON-TRACKING SOLAR COLLECTOR earlier filed in the Argentina National Institute of Industrial Property on Aug. 3, 1998 and there duly assigned Serial No. P98-0104012.

BACKGROUND OF THE INVENTION

1. Technical Field

This invention pertains to the class of devices for the collection and utilization of solar energy and, more particularly, to devices utilizing solar energy for interior lighting.

2. Related Art

Due to lack of space, in the design or renovations performed to a building many rooms or parts of houses, sheds, offices, storerooms, and the like, are left without much natural light. This situation causes the immediate need to resort to electrical lighting, with the consequent cost incurred due to electrical consumption.

Whenever possible, alternative lighting by means of skylights which are preferably placed on an already existing roof should be considered. Currently available skylights, however, show some deficiencies. One problem is that making a large opening in the roof where the skylight is going to be placed is invariably necessary. Making this hole is usually difficult and expensive, particularly when the roof is a reinforced concrete slab. The larger the hole, the more difficult and expensive this is.

A second problem with large holes is that of break-ins through the skylight. In order to avoid a break-in, these openings require, besides the sky-light itself, the installation of bars to impede the access to the interior, thus increasing the installation cost. This can also be an esthetic problem.

Another problem is that of rain leakage where the skylight meets the roof. The bigger the opening, the greater the risk of rain leakage. Yet another problem is that most of the existing skylights are not very decorative. Most of them do not correspond with the room's interior design criteria and are not easily adapted to do so.

A number of U.S. patents address aspects of solar energy collection. For example, the following U.S. patents describe devices for the concentration of solar energy generally for solar heating purposes but do not describe use for interior lighting. U.S. Pat. No. 3,899,672, to Levi-Setti, entitled *Solar Energy Collection*, U.S. Pat. No. 3,923,381 to Winston entitled *Radiant Energy Collection*, U.S. Pat. No. 4,003,638 to Winston, entitled *Radiant Energy Collection* and U.S. Pat. No. 4,131,485 to Meinel et al., entitled *Solar Energy Collector and Concentrator* all describe conical or trough-shaped solar collection devices for solar heating. Other patents describing the use of parabolic or curved mirrors to concentrate solar energy include U.S. Pat. No. 3,964,464 to Hockman, entitled *Solar Radiation Collector and Concentrator*, U.S. Pat. No. 4,222,370, to DeGeus, entitled *Nontracking Concentrating Solar Collector*, and U.S. Pat. No. 4,561,424, to Gill et al., entitled *Nontracking Parabolic Solar Energy Collecting Apparatus*. U.S. Pat. Nos. 3,902,794, to Abrams, entitled *Fresnell Lens*, and 4,612,913, to Mori, entitled *Solar Energy Collector Array*, use Fresnel reflectors for concentration. Other approaches are seen in U.S. Pat. Nos. 5,374,317, to Lamb et al., entitled *Multiple Reflector Concentrator Solar Electrical Power System* and 5,578,140, to Yogev et al., entitled *Solar Energy Plant*, describe multiple reflector systems. U.S. Pat. No. 5,062,899, to Kreuer, entitled *Wide Acceptance Angle, High Concentration Ratio Optical Collector*, describes a Cassegrain collection system. None of these patents, however, specifically describes a device designed to transmit the collected light to a room for lighting.

A number of patents do describe the collection of sunlight to provide room lighting. Some of these involve the use of transparent domes or skylights on the roof. Examples include U.S. Pat. No. 4,329,021, to Bennet et al., entitled *Passive Solar Lighting System*, U.S. Pat. No. 4,349,245, to Kliman, entitled *Modular Natural Lighting System*, U.S. Pat. No. 4,883,340, to Dominguez, entitled *Solar Lighting Reflector Apparatus Having Slatted Mirrors And Improved Tracker*, U.S. Pat. No. 5,099,622, to Sutton, entitled *Skylight*, U.S. Pat. No. 5,467,564 to DeKeyser et al., entitled *Daylight Collection And Distribution System*, U.S. Pat. No. 5,493,824 to Webster et al., entitled *Rotatably Mounted Skylight Having Reflectors*, U.S. Pat. No. 5,648,873, to Jaster et al., entitled Passive Solar Collector, and U.S. Pat. No. 5,655,339, to DeBlock et al., entitled *Tubular Skylight With Improved Dome*. However, in all of these patents, only the sunlight impinging on an area essentially equal to that of the skylight roof hole is transmitted. That is, there is no concentration and use of sunlight falling away from the aperture in the roof. Thus, to bring in reasonable amounts of sunlight may require quite large roof apertures.

A number of U.S. patents do describe interior lighting using means of collecting and concentrating sunlight from a wider area than the skylight access hole through the roof. For example, U.S. Pat. No. 4,201,197, to Dismer, entitled *Solar Energy Collector Having A Fiber-Optic Cable*, uses a parabaloidal mirror and a smaller mirror to focus light onto fiber-optics. This device involves a parabolic dish which must be motorized to track the sun, however. U.S. Pat. No. 4,306,769, to Martinet, entitled *Interior Illumination Apparatus Using Sunlight*, describes a trumpet-shaped light pipe with a secondary reflector. This apparatus, however, requires vertical support of the collection trumpet on top of the light pipe, probably increasing the weight and limiting the size of the trumpet collector. U.S. Pat. No. 4,411,490, to Daniel, entitled *Apparatus for Collecting, Distributing and Utilizing Solar Radiation*, involves a complex array of solar gathering cells, which are probably expensive and difficult to install. U.S. Pat. No. 4,475,536, to Dame, entitled *Solar Collector-Skylight Assembly*, describes a complex arrangement of parabolic reflectors. Its design is complex and undoubtedly expensive, resulting from its dual function as a solar heater. U.S. Pat. No. 4,514,414, to Mori, entitled *Apparatus for Collecting Sunlight*, describes a tall, roughly conical reflector. This system is actually designed to collect diffuse rather than direct sunlight, and the device has a fairly large mass compared to its light collection area, both factors probably limiting the amount of light usefully transmitted to the interior. U.S. Pat. No. 4,575,196, to Clegg, entitled *Conical Beam Concentrator*, is a device consisting of a vertical series of lenses. Such a device is undoubtedly expensive and may have weight limitations on its size. U.S. Pat. No. 5,540,216, to Rasmusson, entitled *Apparatus And Method for Concentrating Radiant Energy Emanated By A Moving Energy Source*, involves a static collector using two facing concave reflectors; the second reflector including small convex surfaces, which divert the beams towards an objective. The complexity of the surfaces of this device probably makes it expensive to manufacture. Thus the devices described in the above patents probably suffer from problems of expense, limited light transmission, or difficulty of installation.

Based on my observation of the art, I have discovered that what is needed is an improved skylight with a narrow light conduit penetrating the roof which nonetheless provides a high transmission of light from the outside to the inside of the building. Such a skylight, which concentrates sunlight but requires only a small aperture in the roof, can solve the problems addressed earlier, including minimizing the size of the hole which must be made to the roof, lowering the installation cost, avoiding the hazard of break-ins, and improving room esthetics.

SUMMARY OF THE INVENTION

It is therefore, an object of the present invention to provide an improved skylight for a building.

It is another object to provide a skylight with improved efficiency of light transmission to the interior of the building.

It is still another object to provide a skylight requiring only a narrow hole in the roof of the building where it is installed.

It is yet another object to provide a skylight offering improved ease of installation.

It is a further object to provide a skylight allowing inexpensive installation.

It is a still further object to provide a skylight offering improved resistance to break-in, through the skylight, of the building where the skylight is located.

It is a yet further object to provide a skylight offering improved resistance to roof leakage where the skylight is installed.

It is a still yet further object to provide a skylight which is esthetic and decorative.

It is also an object to provide a skylight which is adaptable to the decor of the room which is located.

It is an additional object to provide a skylight which requires no motor and only minimal adjustment to track the sun.

These objects are effectively met with the small skylight described in the present invention, since this skylight uses a tubular body of small diameter or section placed through the roof thickness, incorporating a capturing means for exterior sunlight and reflecting it towards this tube in order to be transmitted to the room's interior. The present invention is a small skylight composed of a light conduit or tube slightly taller than the thickness of the roof in which it will be installed. This light conduit or tube is placed in a vertical position, and has open ends, or bases, its internal surface being preferably polished or showing great light-reflecting capacity. A mirror plate is placed in correspondence to the superior-exterior base, provided in an oblique position, facing the interior of the tube. A wide external reflecting sheet completes the device, this sheet projecting above the roofs external surface in a slightly tilted position relative to the horizontal plane, such that the surface rises as it withdraws from the tube. The reflecting sheet or external reflector collects solar beams and sends them to the obliquely positioned mirror, this mirror reflecting the beams towards the interior of the small tube, substantially increasing the lighting capacity transmitted towards the interior of the room.

The embodiments of the invention demonstrate that the improvement of the natural light transmission capacity is greater than with any skylight known in the art, with the same diameter or section. Therefore, according to the present invention, better natural lighting results can be obtained, with a minimum roof opening installation, having no need for closing bars. The skylight of the present invention is extremely simple and consequently rain leakproof and its shape is easily adaptable to the decorative design of the room to be lighted.

BRIEF DESCRIPTION OF THE DRAWINGS

The advantages herein briefly described will be more fully understood, and further advantages will become apparent to users and those skilled in the art. In order to facilitate the understanding of the constructive, constitutive and functional characteristics of the skylight of the present invention, a preferred embodiment is hereinafter described, which is schematically illustrated—with no specific scale—in the enclosed figures. It should be apparent that the following is only an example and should not be considered as restrictive or exclusive to the scope of the present invention. Consequently, the following example is intended for explanatory and illustrative purposes of the idea in which the present invention is based on.

All reference numbers in the figures correspond to the same or equivalent parts or constitutive elements of the device, according to the example chosen for the illustration of the skylight of the present invention.

DETAILED DESCRIPTION OF THE DRAWINGS

Figure 1:
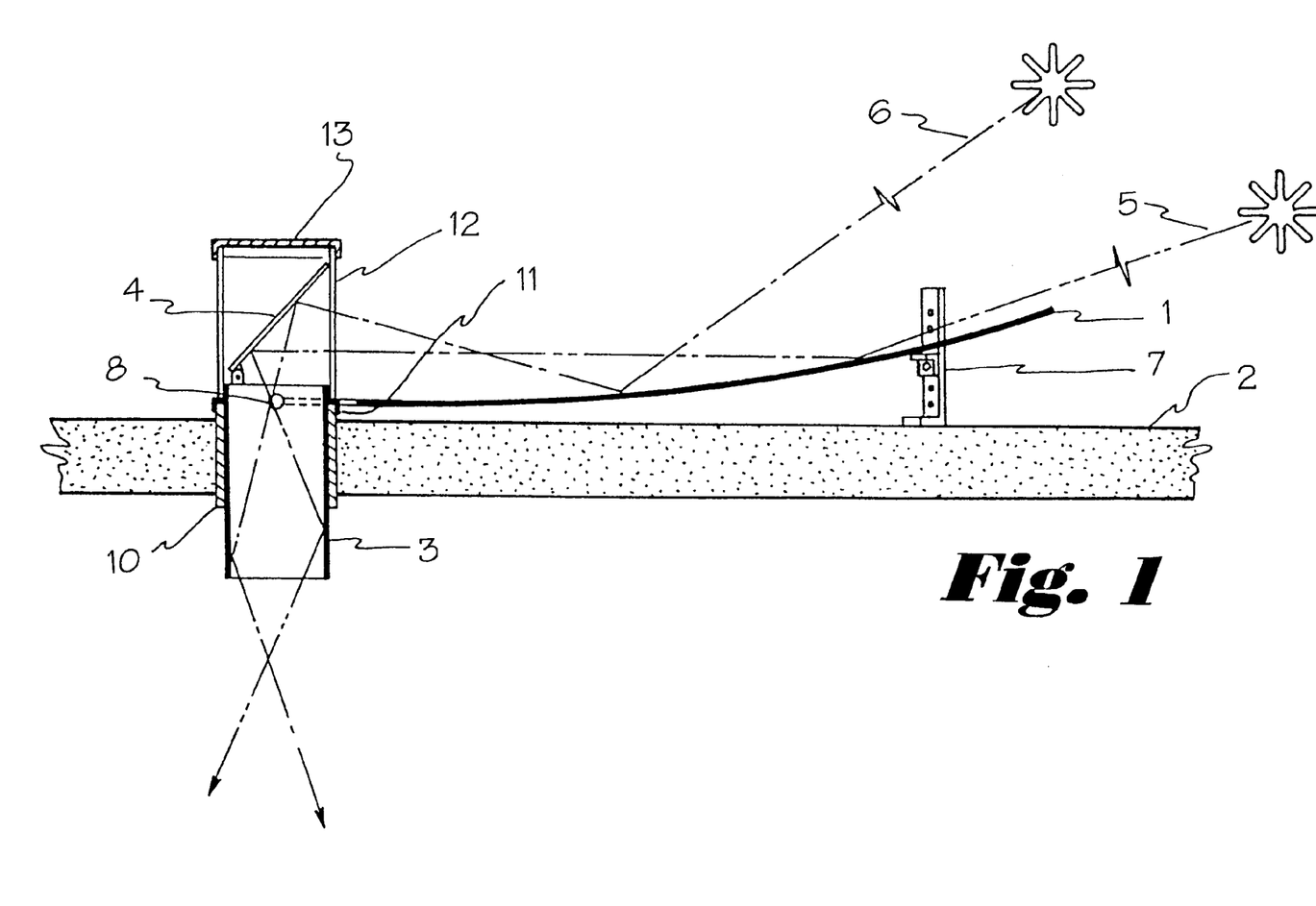
FIG. 1 is a vertical cross-section illustrating the skylight assembly placed on a roof formed by a slab, shown schematically in order to make its functioning principle explicit.
Figure 2:
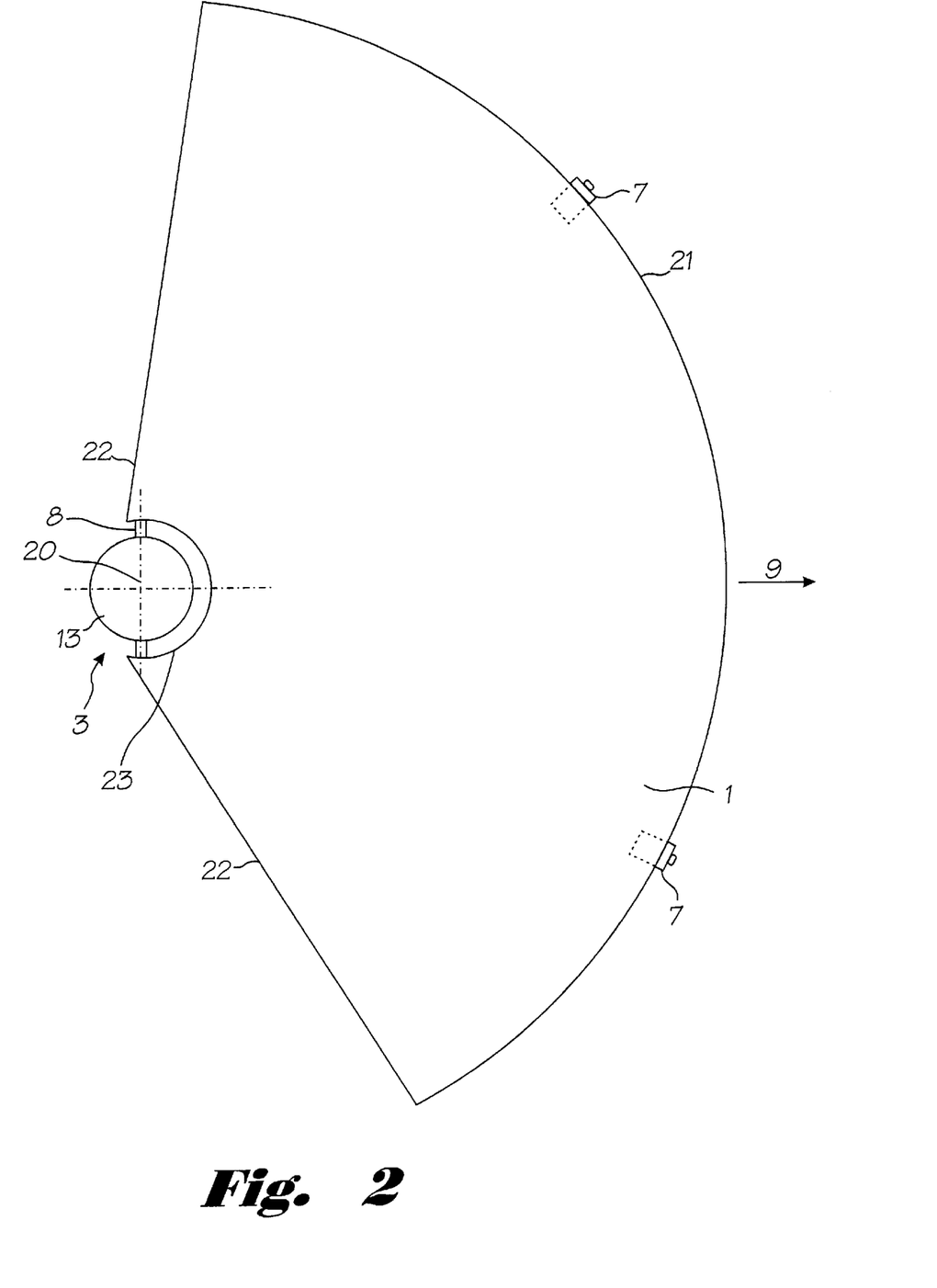
FIG. 2 is a top plan view illustrating an external reflector, a sheet collecting and reflecting solar beams.

As can be seen in FIG. 1, the skylight of the present invention is based on the use of external reflector 1. This reflector can be flat or slightly concave upward, having a general structure such as a sector of a circle (see FIG. 2), and can be constructed of different materials among which a stainless steel or aluminum polished sheet is preferred. Reflecting plate 1 has a round opening where spindles 8 are attached, and reflecting plate 1 is supported by and tilts on spindles 8 and also rests on vertical supports 7, maintaining reflecting plate 1 in a slightly elevated position over the roof. More specifically, reflecting plate 1, as shown in FIG. 2, has outer edge 21 corresponding to a portion of the circumference of an outer circle, side edges 22 lying along radii of the outer circle, and inner edge 23, defining a substantially semicircular opening offset slightly inward from the center of the outer circle. Attached to inner edge 23 are two spindles 8, defining axis 20 around which external reflector 1 may be slightly tilted. External reflector 1 is further mounted on vertical supports 7, maintaining it slightly above the roof. Peripherally placed vertical supports 7 have an adjustable height in order to allow the user to determine the tilting degree appropriate to the sun's position in the current season.

Light conduit, or tube, 3 goes through roof 2 above the room to be lighted, and allows the natural light to pass towards the interior of said room. Light conduit, or tube, 3 can be made from a metal such as stainless steel or aluminum, having its internal surface duly treated to facilitate sunlight reflection. Mirror 4 is placed above light conduit 3, mirror 4 being a prism or a reflecting surface. The function of mirror 4 is to divert downwards the light coming from external reflector 1; this arrangement is similar to the top part of a periscope.

Figure 3:
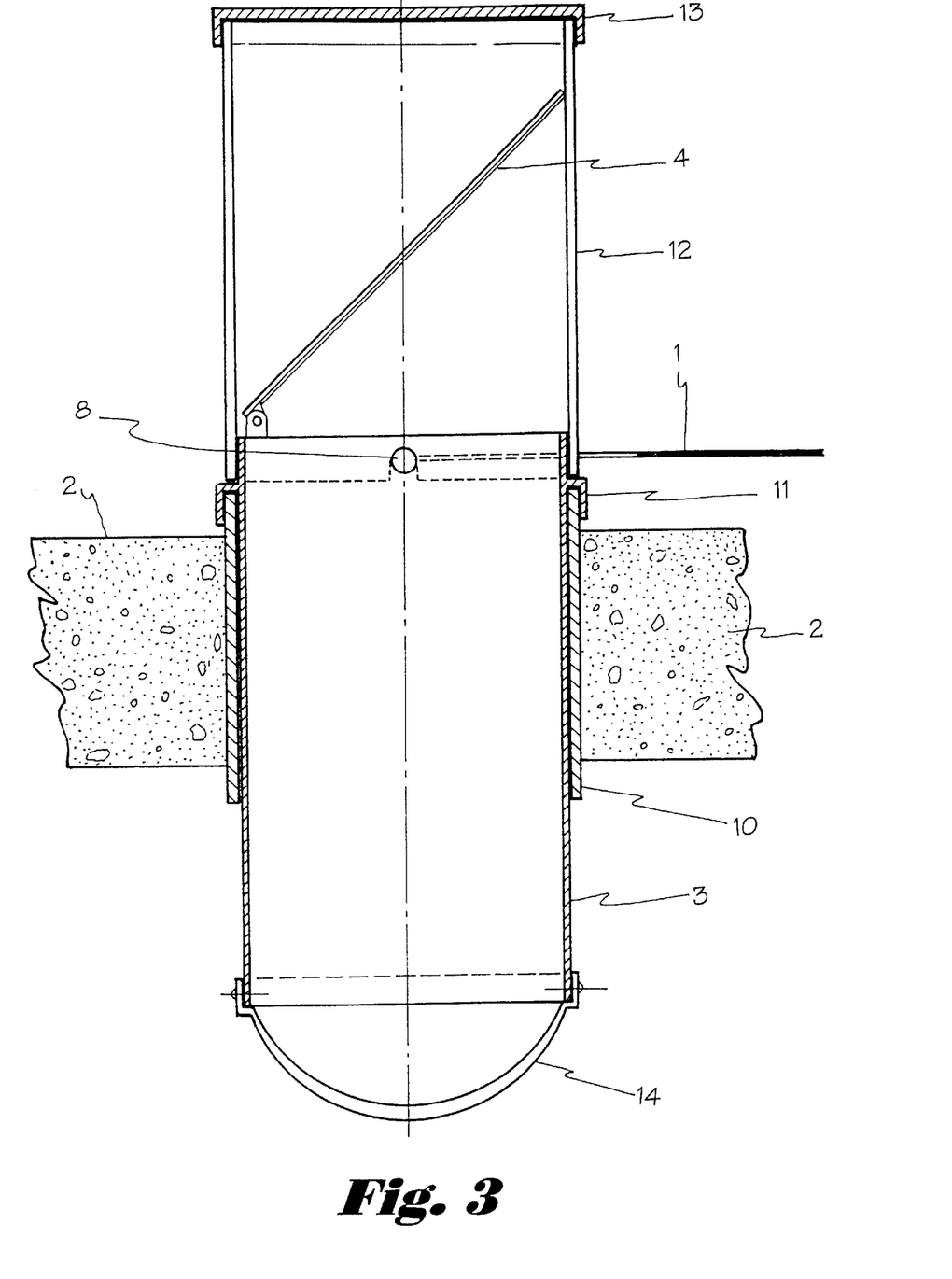
FIG. 3 is a vertical cross section blown up detail illustrating a preferred embodiment of the light conduit installed in the roof in order to provide natural lighting to the interior of a room.

In one embodiment of the invention, seen in FIG. 3, light conduit 3 includes on its upper section, rib projection 11, which rests on jacket tube 10, jacket tube 10 being mounted in roof 2. On rib projection 11 is transparent cowl 12. Lid 13, on top of transparent cowl 12, functions to close the assembly in order to avoid any unwanted rain or dust entrance. The axis 8 lies on properly defined openings corresponding to the superior circumferential border of light conduit 3 also going through second openings performed on said cowl inferior border 12. Sealing means known in the art will produce the tight closure of the assembly, it being still possible for the user to rotate light conduit 3 together with transparent cowl 12 and external reflector 1 supported by transparent cowl 12, and thus track the assembly towards a more effective functioning position.

One of the problems posed by the desire to take advantage of solar energy is following this sun. Motorized tracking devices are too complex and consequently expensive as a means for following the sun's seasonal and diurnal movement. The present invention obviates motorized tracking. As can be seen in FIGS. 1 and 2, in the present invention, sunlight collection is achieved through external reflector 1 which has a very wide acceptance range for the light incidence angle. This is a very simple solution, lacking any moving parts, and only requiring minor seasonal adjustments if the user desires an optimum functioning.

Most solar energy collectors known in the art require solar energy concentration, using concave mirrors, or very special optical systems such as "cassegrain", generally concentrating light in one focus. As can be seen in the case of low angle incident radiation 5 and high angle incident radiation 6, the present invention uses external reflector 1, collecting incident sunlight and reflecting it toward mirror 4. FIG. 1 shows that when low angle incident radiation 5 is sent by external reflector 1 towards mirror 4 and then towards the interior of light conduit 3, whose internal surface is duly treated as has been previously mentioned, the light beams' exit is tracked towards the interior of the room.

In a different season, when the sun appears at a greatest height on the horizon, high angle incident radiation 6 is similarly collected by external reflector 1, and no further adjustment is required. However, the present invention also provides an improvement in the functional efficiency of external reflector 1, by adjusting the sun incidence angle a few times a year, changing the height of the supporting rib of said adjustable height support 7 since said rib can rotate on spindles 8 around axis 20 changing the tilting angle of external reflector 1.

In this respect, in FIG. 2 the format chosen for external reflector 1 can be seen to be a circular section having about 120° amplitude, thus covering most of the sun's course in the sky during the day. Arrow 9 in FIG. 2, shows how this device should be oriented. Arrow 9 is roughly parallel to the meridian where the device is, and points toward the equator, i.e., approximately to the North in the Southern hemisphere and to the South in the Northern hemisphere.

If, for example, more lighting is preferred during the morning, the only requirements will be to rotate the device towards the rising of the sun. It should be noted that said skylight thus constituted will also work with small light amounts, even in the shade, since said skylight collects diffuse atmospheric light. This is to say that the skylight is also prepared for collecting and transmitting sunlight reflected on small suspended dust particles or vapor. Consequently, the invented device provides a light lighting both at sunrise as well as at sunset, even if not receiving direct sunlight or on a cloudy day.

FIG. 3 specifically shows that this skylight rotates with respect to jacket tube 10, since light conduit 3 lies on said jacket tube by means of the rib projection 11, also avoiding rain entrance. FIG. 3 shows external reflector 1 supported by spindles 8, on which it can be rotated about axis 20 whenever regulating the vertical incidence angle is required. Transparent cowl 12 can be a glass tube or any other transparent material impeding mirror 4 from dirtying. The top closing of the assembly is provided by lid 13.

Another embodiment of this invention provides transparent cover 14 on the bottom of light conduit 3, inside the room. Transparent cover 14 may be dome-shaped or of similar shape, the function of transparent cover 14 being to disperse or diffuse the radiated light at a greater angle in order to produce a more uniform lighting.

Figure 4:
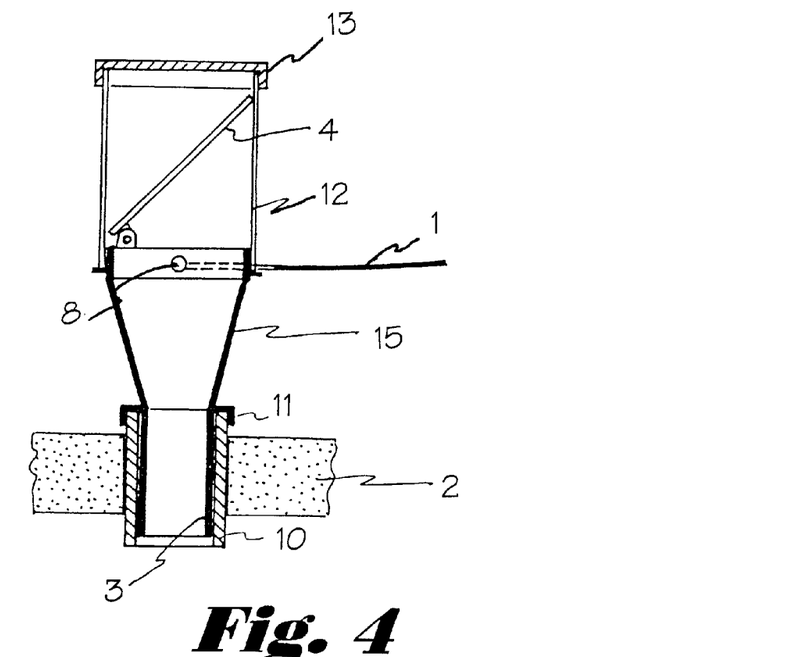
FIG. 4 is also a vertical cross section illustrating a constructive variation of the light conduit installed in the roof of the room to be lighted.

Another embodiment covered by the scope of this invention is that shown by FIG. 4, where mirror 4 is wider than the diameter of light conduit 3. In this case, light conduit 3 is modified to include conical connector 15, having the shape of a truncated cone and whose interior surface is also capable of reflecting light. This solution is useful for cases when the user wishes to have a very small roof opening.

Figure 5:
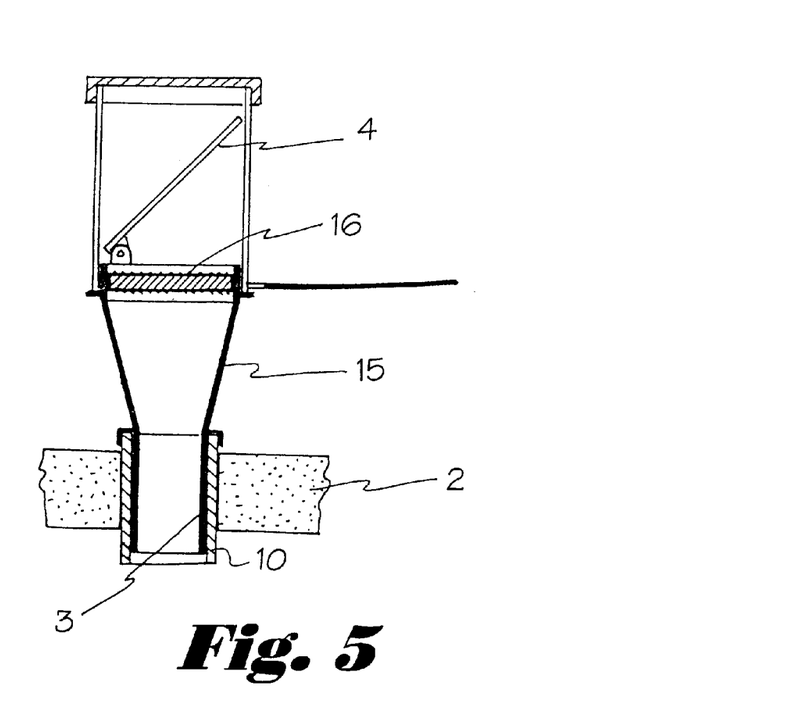
FIG. 5 is also a vertical cross section illustrating another constructive variation of the light conduit installed in the roof of the room to be lighted.

Another embodiment, also having conical connector 15, is shown in FIG. 5. In this embodiment, lens 16, which can be a "Fresnel" lens or another optical concentration means to concentrate light in light conduit 3, is included in the lower interior portion of transparent cowl 12 or the upper region of conical connector 15.

Figure 6:
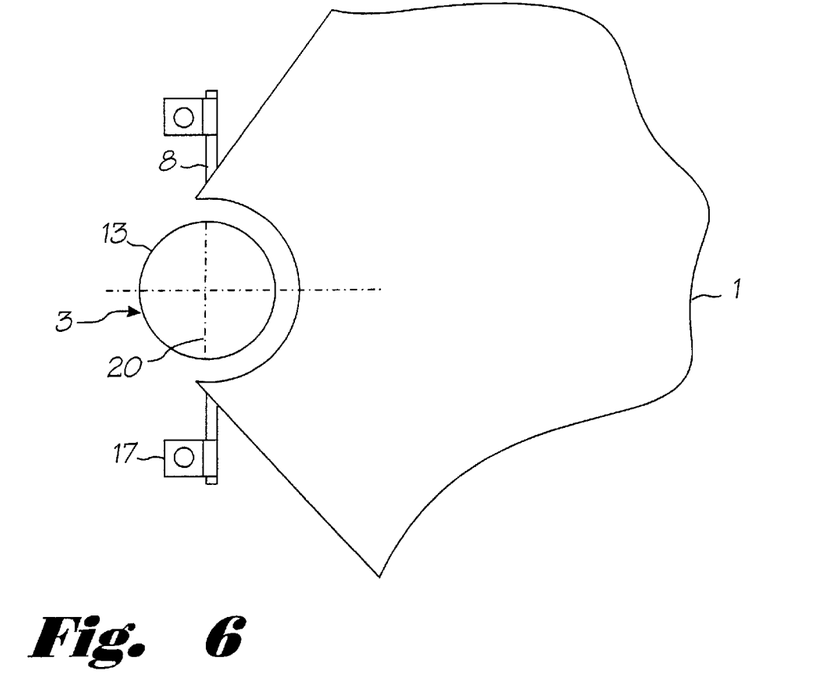
FIG. 6 is a plan view, similar to FIG. 2, illustrating a constructive variation of the external reflector assembly.

In yet another embodiment, shown in FIG. 6, external reflector 1 is mounted independent from the body of light conduit 3, in such a way that light conduit 3 can rotate independently without pulling along external reflector 1, In this embodiment, the user can rotate light conduit 3 from the interior of the room and can thereby regulate the light intensity to a desired level during the day. In this case, spindles 8 on which the reflector is installed, are fastened to the roof by means of supports 17.

Figure 7:
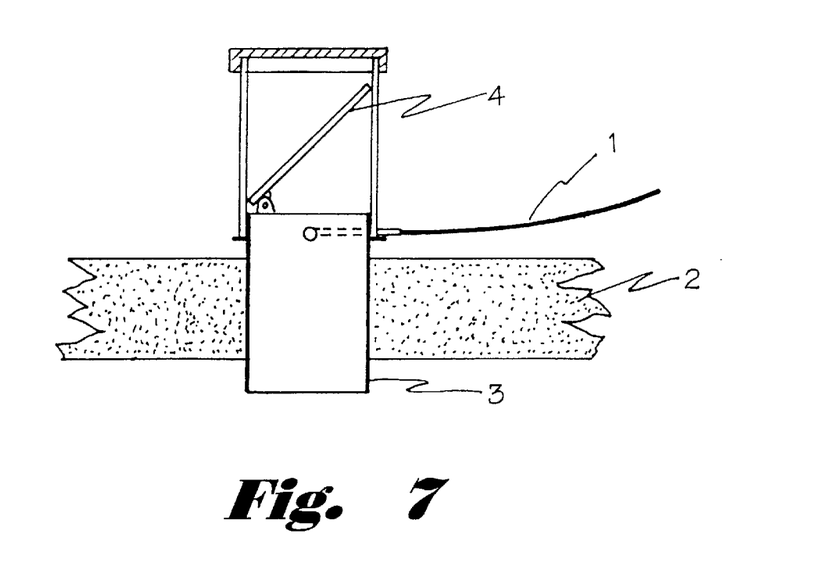
FIG. 7 is a vertical cross section of an embodiment of the invention illustrating a variation in the light conduit mounted in a slab roof.
Figure 8:
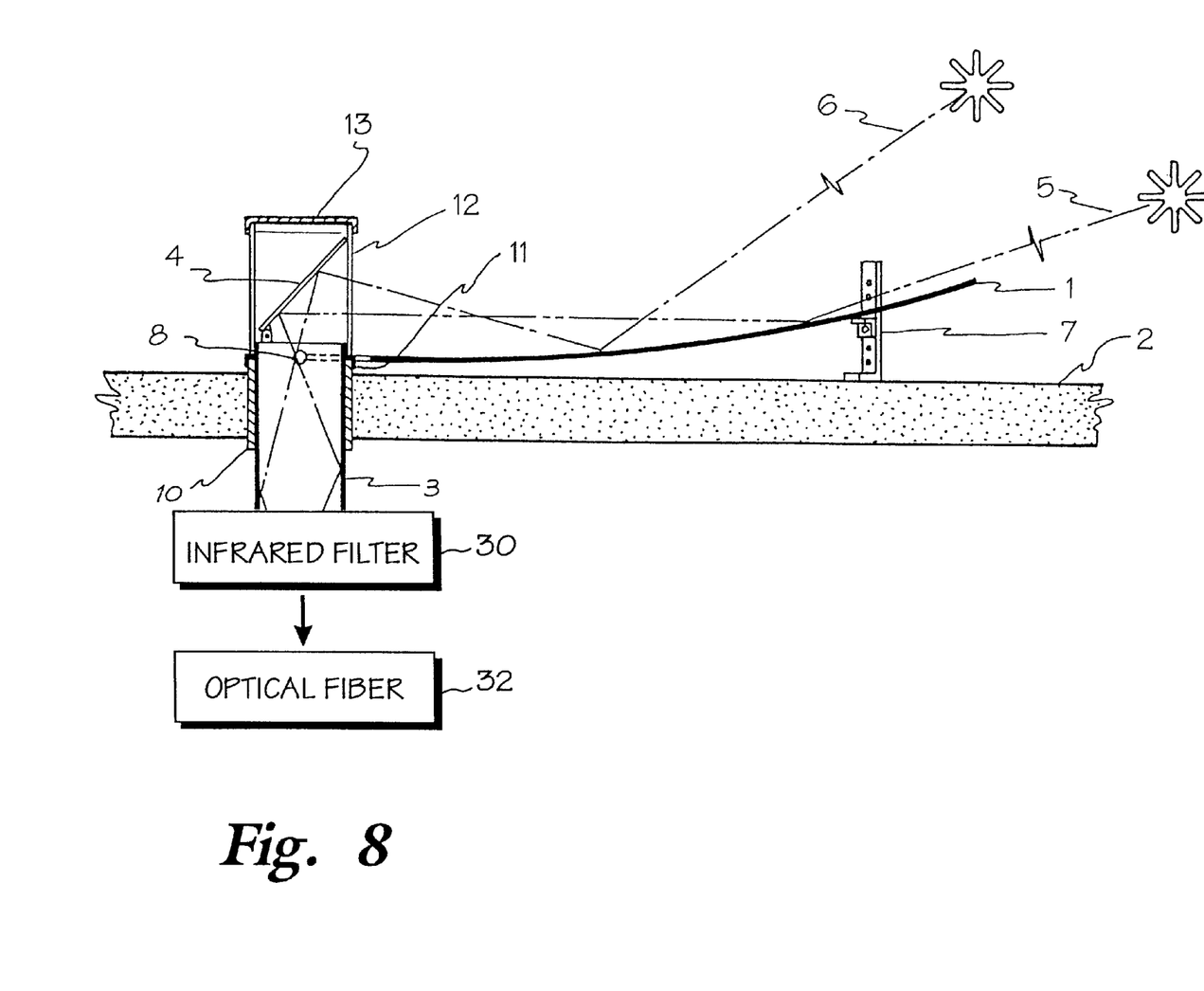
FIG. 8 is a schematic view of another embodiment of the invention.

It should be noted that light conduit 3 may have any horizontal cross-section. In an additional embodiment, light conduit 3 can also be stationary, as shown in FIG. 7, where jacket tube 10 is not used. In another embodiment shown schematically in FIG. 8, this device can be also applied to illuminate optical fibre 32, in which case infrared filters 30 will be needed in order to keep the temperature low.

Generally, the device of the present invention can be used as a wide acceptance angle collector for any kind of radiant energy. Having thus described the invention in rather full detail, it will be readily apparent to a person of ordinary skill that various changes and modifications can be made without departing from the spirit of the invention. All of such changes and modifications are contemplated as being within the scope of the present invention as defined by the subjoined claims.

What is claimed is:

1. A skylight mounted through the roof of a building, comprising:

a light conduit mounted vertically through an aperture in the roof, said light conduit being essentially cylindrical, said light conduit having an inside surface which reflects light and said light conduit having a top opening and a bottom opening;

a transparent cowl, said transparent cowl being essentially cylindrical and said transparent cowl being mounted coaxially with and on the top opening of said light conduit;

a lid mounted on said transparent cowl;

a mirror mounted obliquely downward inside said transparent cowl; and an external reflector mounted to the roof near the aperture in the roof and generally toward the earth's equator, so as to reflect sunlight toward said mirror.

2. The skylight of claim 1, further comprising said external reflector having a flat surface.

3. The skylight of claim 1, further comprising said external reflector having a surface which is curved concave upward.

4. The skylight of claim 1, further comprising:

said external reflector being shaped approximately as a sector of an outer circle, said external reflector having two side edges which lie along two radii of said outer circle, a back edge which is a portion of the circumference of said outer circle, and a front edge which is approximately a semicircle of diameter slightly larger than the outside diameter of said light conduit, said center of said front edge being offset slightly toward said back edge from the center of said outer circle;

said external reflector being positioned so that the center of said semicircle approximately corresponds to the center of said top of said light conduit; and said external reflector being oriented so that the direction bisecting said two radii points roughly along the North-South meridian toward the earth's equator.

5. The skylight of claim 4, further comprised of said two side edges of said external reflector defining an angle of approximately 120 degrees.

6. The skylight of claim 4, further comprised of:

said external reflector being tiltably mounted around an axis oriented horizontally and approximately East-West, said axis passing roughly through the center of said semicircle.

7. The skylight of claim 6, further comprised of:

said external reflector further comprising two spindles affixed to said external reflector and oriented along said axis pointing toward the center of said semicircle and extending past said front edge of said external reflector;

said two spindles being adjustably attached to said light conduit; and a vertical support affixed to said roof and adjustably mounted to said back edge of said external reflector.

8. The skylight of claim 6, further comprised of:

said external reflector further comprising two spindles affixed to said external reflector and oriented along said axis pointing away from the center of said semicircle and extending past said side edges of said external reflector;

a plurality of supports affixed to the roof, said supports retaining said two spindles; and a vertical support affixed to said roof and adjustably mounted to said back edge of said external reflector.

9. The skylight of claim 1, further comprised of:

said light conduit being mounted rotatably about its cylindrical axis.

10. The skylight of claim 1, further comprised of:

a jacket tube, mounted in said aperture in the roof, said jacket tube surrounding said light conduit;

said light conduit being rotatable about its cylindrical axis within said jacket tube.

11. The skylight of claim 1, further comprised of a transparent cover mounted on the bottom opening of said light conduit.

12. The skylight of claim 1, further comprised of:

said transparent cowl having a diameter greater than that of said light conduit;

a conical connector installed between said transparent cowl and said light conduit;

said conical connector having the general shape of a hollow truncated cone having a narrow end of diameter similar to that of said light conduit and a wide end of diameter similar to that of said transparent cowl;

said narrow end of said conical connector being attached to said top end of said light conduit and said transparent cowl being attached to said wide end of said conical connector; and said conical connector having a light-reflective inside surface.

13. The skylight of claim 12, further comprising:

a lens mounted inside said wide end of said conical connector.

14. The skylight of claim 1, further comprising:

means for filtering infrared light from the light passing down the light conduit; and optical fibers connected at the bottom of said light conduit to further conduct the light.

15. The skylight of claim 1, further comprising said external reflector being made of stainless steel or aluminum.

16. The skylight of claim 1, further comprising said mirror being a prism which reflects light.

17. A skylight mounted through the roof of a building, comprising:

a light conduit mounted vertically through an aperture in the roof, said light conduit being polygonal in cross-section, said light conduit having an inside surface which reflects light and said light conduit having a top opening and a bottom opening;

a transparent cowl, said transparent cowl being essentially cylindrical and said transparent cowl being mounted coaxially with and on the top opening of said light conduit;

a lid mounted on said transparent cowl;

a mirror mounted obliquely downward inside said transparent cowl; and an external reflector mounted on the roof near the aperture in the roof and generally toward the earth's equator, so as to reflect sunlight toward said mirror.

* * * * *